United States Patent
Northcott et al.

(10) Patent No.: US 10,414,344 B1
(45) Date of Patent: Sep. 17, 2019

(54) SECURABLE STORAGE COMPARTMENTS

(71) Applicants: Malcolm J. Northcott, Santa Cruz, CA (US); Matthew E. Last, San Jose, CA (US); Kan Zhou, Sunnyvale, CA (US); David P. Perner, San Francisco, CA (US)

(72) Inventors: Malcolm J. Northcott, Santa Cruz, CA (US); Matthew E. Last, San Jose, CA (US); Kan Zhou, Sunnyvale, CA (US); David P. Perner, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/686,274

(22) Filed: Aug. 25, 2017

Related U.S. Application Data

(60) Provisional application No. 62/382,458, filed on Sep. 1, 2016.

(51) Int. Cl.
| | |
|---|---|
| *B60R 7/04* | (2006.01) |
| *B60R 11/00* | (2006.01) |
| *B60P 3/03* | (2006.01) |
| *B60R 7/08* | (2006.01) |

(52) U.S. Cl.
CPC ...... *B60R 7/04* (2013.01); *B60P 3/03* (2013.01); *B60R 7/087* (2013.01); *B60R 2011/0092* (2013.01); *B60R 2011/0098* (2013.01)

(58) Field of Classification Search
CPC ... B60R 7/04; B60R 7/087; B60R 2011/0092; B60R 2011/0098; B60P 3/03
USPC .................................... 296/37.1–37.16
See application file for complete search history.

(56) References Cited

U.S. PATENT DOCUMENTS

| | | | |
|---|---|---|---|
| 4,913,252 A | 4/1990 | Bartley et al. | |
| 6,100,811 A | 8/2000 | Hsu et al. | |
| 8,434,577 B1 | 5/2013 | Al-Qaffas | |
| 8,901,442 B1 | 12/2014 | Dilone | |
| 9,097,549 B1* | 8/2015 | Rao | G01C 21/3461 |
| 10,216,188 B2* | 2/2019 | Brady | G05D 1/0088 |
| 2014/0151173 A1 | 6/2014 | Reh et al. | |
| 2014/0277841 A1 | 9/2014 | Klicpera et al. | |
| 2015/0006005 A1* | 1/2015 | Yu | G06Q 10/08 |
| | | | 701/22 |
| 2015/0202770 A1* | 7/2015 | Patron | G05D 1/024 |
| | | | 700/245 |
| 2015/0227882 A1* | 8/2015 | Bhatt | G06Q 10/083 |
| | | | 705/330 |
| 2015/0348347 A1 | 12/2015 | Diz et al. | |
| 2016/0026967 A1* | 1/2016 | Shah | G06Q 10/083 |
| | | | 701/28 |
| 2016/0189098 A1* | 6/2016 | Beaurepaire | G06Q 10/0835 |
| | | | 705/337 |
| 2016/0203649 A1* | 7/2016 | Berkobin | G06Q 20/12 |
| | | | 705/13 |

(Continued)

*Primary Examiner* — Gregory A Blankenship
(74) *Attorney, Agent, or Firm* — Young Basile Hanlon & MacFarlane, P.C.

(57) ABSTRACT

A vehicle includes a vehicle body and storage compartments that are located in the vehicle body. Each of the storage compartments has a cavity and a closure that selectively secures the cavity. A respective authorization input is associated with each of the storage compartments. The closure of each of the storage compartments is operable to unsecure the cavity upon receipt of the respective authorization input.

24 Claims, 5 Drawing Sheets

(56) References Cited

U.S. PATENT DOCUMENTS

| | | | |
|---|---|---|---|
| 2016/0232489 A1* | 8/2016 | Skaaksrud | G06Q 10/0833 |
| 2016/0235236 A1* | 8/2016 | Byers | A47G 29/14 |
| 2017/0139413 A1* | 5/2017 | James | G05D 1/0088 |
| 2017/0291766 A1* | 10/2017 | Orth | B65G 1/0485 |
| 2017/0357919 A1* | 12/2017 | Bischoff | B07C 3/08 |
| 2018/0024554 A1* | 1/2018 | Brady | G05D 1/0088 |
| 2018/0061162 A1* | 3/2018 | High | G06Q 10/083 |
| 2018/0144300 A1* | 5/2018 | Wiechers | G06Q 10/0836 |
| 2018/0158020 A1* | 6/2018 | Khasis | G06Q 10/0833 |
| 2018/0189716 A1* | 7/2018 | Crone | G06Q 10/083 |
| 2018/0224844 A1* | 8/2018 | Zhang | G05D 1/005 |
| 2018/0232693 A1* | 8/2018 | Gillen | G06Q 10/0834 |
| 2018/0253981 A1* | 9/2018 | Raptopoulos | G06Q 10/083 |

* cited by examiner

SECURABLE STORAGE COMPARTMENTS

CROSS-REFERENCE TO RELATED APPLICATION(S)

This application claims the benefit of U.S. Provisional Application No. 62/382,458, filed on Sep. 1, 2016, entitled "Securable Storage Compartments," the content of which is incorporated herein by reference in its entirety for all purposes.

TECHNICAL FIELD

This disclosure relates to storage devices and, in particular, securable and movable storage devices used with vehicles.

SUMMARY

One aspect of the disclosure is a vehicle that includes a vehicle body and storage compartments that are located in the vehicle body. Each of the storage compartments has a cavity and a closure that selectively secures the cavity. A respective authorization input is associated with each of the storage compartments. The closure of each of the storage compartments is operable to unsecure the cavity upon receipt of the respective authorization input.

Another aspect of the disclosure is a storage compartment. The storage compartment includes a cavity, a closure that is operable to secure the cavity and unsecure the cavity in response to an authorization input, and a propulsion mechanism that is connected to the cavity to autonomously move the cavity.

Another aspect of the disclosure is a method that includes receiving a first user request for access to a storage compartment that is located in a vehicle, wherein the vehicle is at a first location, and receiving contents in the storage compartment from the first user. The method also includes causing the vehicle to move autonomously from the first location to a second location after receiving the contents, wherein the second location is away from the user. The method also includes receiving a second user request for access to the storage compartment, wherein the user is located at a third location, and causing the vehicle to move autonomously from the second location to the third location after receiving the second user request for access to the storage compartment.

DETAILED DESCRIPTION

Figure 1:
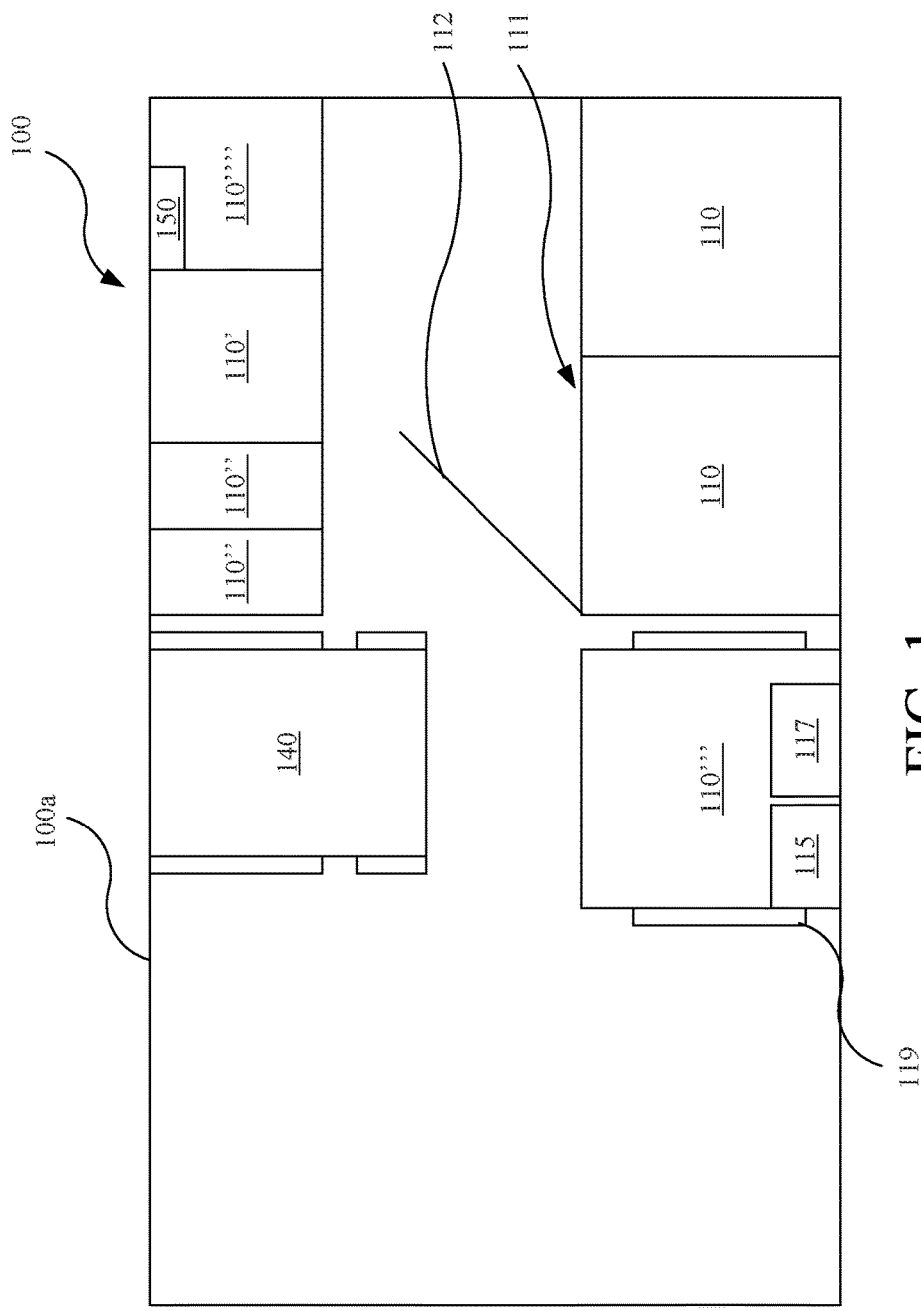
FIG. 1 is a top view of a vehicle with storage compartments according to various exemplary embodiments.
Figure 2:
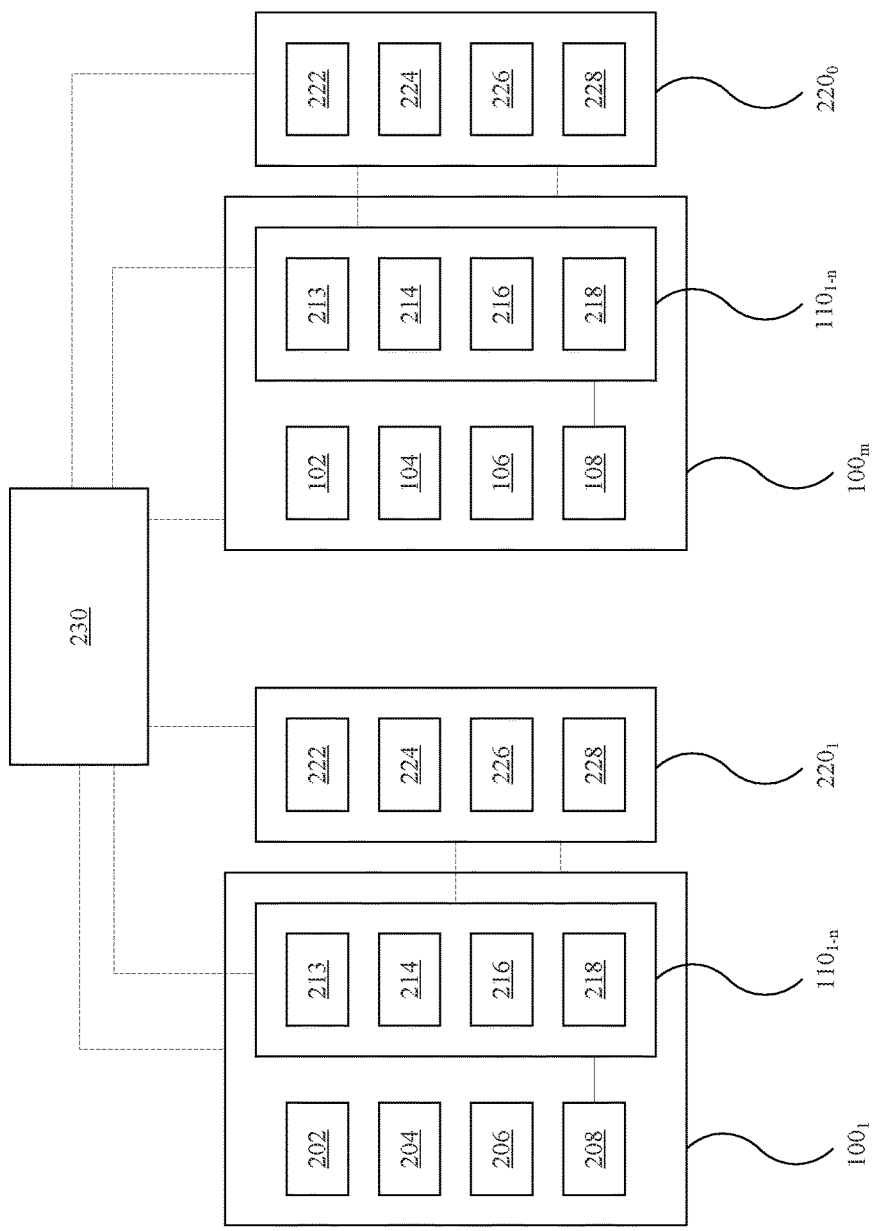
FIG. 2 is a schematic view of a plurality of a plurality of vehicles having a plurality of storage compartments, which are in communication with a plurality of user devices and a central computer system.

Referring to FIGS. 1-2, a vehicle 100 includes one or more secure storage compartments 110 for securely storing possessions of a passenger or other user of the vehicle 100. The vehicle 100 is used or shared by multiple different people that might otherwise be unassociated with each other, for example, in a ridesharing usage model. By providing the secure storage compartments 110, possessions may be stored in the vehicle 100 by a first user and remain secure in the vehicle from subsequent users or passengers of the vehicle 100 until the first user later retrieves their possessions from the storage compartment 110. In various other applications, the storage compartments 110 may also be used or shared by multiple different people independent of any particular vehicle or groups of vehicles, or may be used by or associated with a single person or defined group of people.

The vehicle 100 may be a passenger vehicle (e.g., configured to transport the user), a delivery vehicle (e.g., configured to transport possessions of various users), or provide dual functions of passenger and delivery vehicles. The vehicle 100 may by driven (e.g., by a hired driver or owner of the vehicle 100, or by the passenger) or self-driving (e.g., autonomous).

As shown in FIG. 1, the storage compartments 110 may be located inside a rear (e.g., trunk) of a body 100a of the vehicle 100 (i.e., "a vehicle body"), or may be provided in other locations of the vehicle 100 (e.g., in a passenger compartment, in a front storage compartment, on an external rack of the vehicle 100, and/or towed behind the vehicle 100). The storage compartments 110 may additionally be provided in different sizes or capacities, for example, the storage compartments 110 are larger than first alternative storage compartments 110', which are in turn larger than alternative storage compartments 110".

Each storage compartment 110 includes a cavity 111 (e.g., defined by a housing, box, vessel, etc.) and a closure 112 (e.g., hinged or sliding door) that secures the cavity 111. The closure 112 is selectively lockable (e.g., by including a mechanical and/or magnetic latch) to selectively secure the storage compartment 110 by preventing physical access into the cavity 111. Alternatively, one closure 112 may be associated with more than one cavity 111, so as to secure a plurality of cavities 111. For example, the cavities 111 may be movable relative to the closure 112 (e.g., via a conveyer, turntable, other moving devices of the vehicle 100 or the compartments 110), such that only one cavity 111 is accessible via the closure 112 at a given time.

Furthermore, each storage compartment 110 may be located in a primary compartment defined by the body 100a of the vehicle 100, such as a passenger compartment, trunk, frunk, etc., which may themselves be further securable (e.g., the passenger compartment is itself securable (e.g., using a conventional vehicle key or key fob associated with the vehicle 100 for accessing and/or operating the vehicle 100), and the storage compartment 110 located therein is further securable in the manners described herein.

Referring to FIG. 2, m-numbered vehicles $100_{1-m}$ may each include n-numbered storage compartments $110_{1-n}$, which may be in communication with each other directly or indirectly (e.g., via the central computer system 230 and/or o-numbered user electronic devices $220_{1-o}$. As such, the storage compartments may be operated (e.g., locked/unlocked, secured/unsecured) by user electronic devices 220.

Each vehicle 100 includes one or more controllers 202, one or more input devices 204, one or more sensors 206, and one or more transceivers 208, which may be physically coupled to the vehicle 100 (e.g., part of an infotainment system) or may be provided by another electronic device associated with the vehicle 100 (e.g., a smartphone of a driver or owner of the vehicle 100). The one or more controllers 202 are configured to control or otherwise provide instructions for one or more operations of the vehicle 100, such as by operating a vehicle-end software program (e.g., for ridesharing, ride-hailing, delivery requesting, etc.). The one or more input devices 204 are configured to receive inputs from the driver or passengers of the vehicle 100 (e.g., via a touch screen to receive touch inputs, a microphone to receive voice commands, a camera to observe gestures, fingerprint scanner, etc.). The one or more sensors 206 are configured to observe or sense other characteristics of the vehicle 100 or its environment (e.g., global positioning or other locating sensors, accelerometers, cameras, etc.). The one or more transceivers 208 are configured to send and/or receive various signals (e.g., wirelessly via cellular, Wi-fi, Bluetooth, near field communication, or other suitable wireless communication method) to/from the storage compartments 110, user electronic devices 220 (e.g., smartphones or other portable electronic devices), and/or a central computer system 230. A plurality of vehicles 100 may be considered to cooperatively form a transportation system.

Each storage compartment 110 of a plurality of n-numbered storage compartments 110 in a given vehicle 100 includes, in addition to the cavity 111 and the closure 112, one or more controllers 213, one or more sensors 216, and one or more transceivers 218, which are physically coupled to the storage compartment 110. The storage compartment 110 may additionally include one or more input devices 214. The one or more controllers 213 are configured to control one or more operations of the storage compartment 110, such as by operating the closure 112 to secure or unsecure (e.g., lock/unlock) the cavity 111 according to a software program. The one or more sensors 216 are configured to observe or sense various characteristics of the storage compartment 110 or its environment (e.g., closure status, weight sensors, temperature sensors, humidity sensors accelerometers, global positioning or other locating sensors, cameras, etc., as discussed in further detail below). The one or more transceivers 218 are configured to send and/or receive various signals, such as to/from the vehicle 100, to/from the user electronic devices 220, and/or the central computer system 230. The one or more input devices 214, where included, are configured to receive inputs from the user of the storage compartment 110 (e.g., via a touch screen to receive touch inputs, a microphone to receive voice commands, a camera to observe gestures, fingerprint scanner, etc.). A plurality of storage compartments 110 may be considered to cooperatively form a storage system, which may be part of an individual vehicle 100 or the transportation system formed by the plurality of vehicles 100.

Each user electronic device 220 of a plurality of o-numbered user electronic devices 220 includes one or more controllers 222, one or more input devices 224, one or more sensors 226, and one or more transceivers 228. The one or more controllers 222 are configured to control one or more operations of the user electronic device 220, such as by operating a user-end software program (e.g., for ridesharing, ride-hailing, delivery requesting, etc.). The one or more input devices 224 are configured to receive inputs from the user of the user electronic device 220 (e.g., via a touch screen to receive touch inputs, a microphone to receive voice commands, a camera to observe gestures, fingerprint scanner, etc.). The one or more sensors 206 are configured to observe or sense other characteristics of the user electronic device 220 (e.g., the geographic location of the user electronic device 220). The one or more transceivers 228 are configured to send and/or receive various signals such as to/from the vehicle 100, the storage compartments 110, and/or the central computer system 230. Each user is able to request (e.g., reserve, summon, hail, etc.) one or more of the vehicles 100, one or more of the storage compartments 110, or one or more both via the user electronic device 220 of the user (e.g., owned or otherwise associated with the user). In making such a request, the user, may, for example request that the vehicle 100 and/or storage compartment 110 move to a first geographic location (e.g., to pick up the user as a passenger and/or objects of the user to be delivered) and thereafter be moved to a second geographic location (e.g., via a route between the first and second geographic locations).

The central computer system 230 is in communication with the vehicle 100, the storage compartments 110, and/or the user electronic devices 220. The central computer system 230 may, for example, operate a back-end software program (e.g., for ridesharing, ride-hailing, delivery requesting, etc.), which works in conjunction with the vehicle-end and the user-software programs to facilitate users requesting the vehicles 100 and/or the storage compartments 110. The central computer system 230 may also facilitate other functions, such as transactions, geographic tracking, authorizing access, etc. It should be noted that various the various functions described below may be performed in consolidated and/or distributed manners between the vehicles 100, the storage compartments 110, the user electronic devices 220, and/or the central computer system 230.

Figure 3:
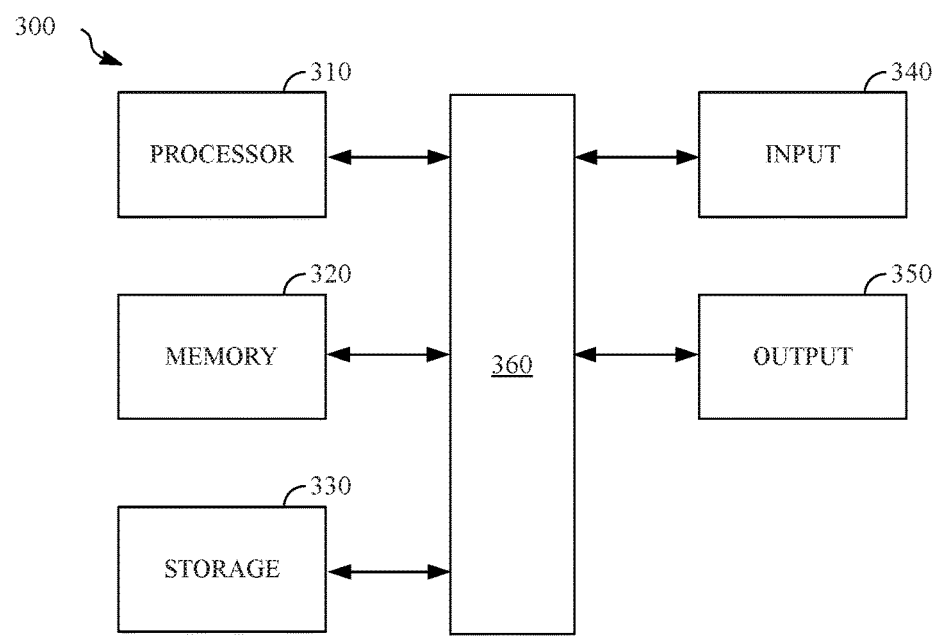
FIG. 3 is a schematic view of exemplary hardware that may be used in conjunction with the vehicles and storage compartments shown in FIGS. 1 and 2.

FIG. 3 shows an exemplary hardware configuration that may be used to implement the various systems disclosed herein, including the various controllers 202, 213, 222 and/or the central computer system 230. A controller 300 may include or otherwise be in communication with a processor 310, a memory 320, a storage device 330, one or more input devices 340 (e.g., the various sensors and/or transceivers described previously), and one/or more output devices 350 (e.g., transceivers, audio output, and/or displays). The controller 300 may include a bus 360 or a similar device to interconnect the components for communication. The processor 310 is operable to execute computer program instructions and perform operations described by the computer program instructions. As an example, the processor 310 may be a conventional device such as a central processing unit. The memory 320 may be a volatile, high-speed, short-term information storage device such as a random-access memory module. The storage device 330 may be a non-volatile information storage device such as a hard drive or a solid-state drive.

Referring back to FIGS. 1-2, as referenced above, the closure 112 is selectively controlled (e.g., locked or unlocked) to prevent or provide physical access to the cavity 111 thereof. More particularly, the compartment controller 213 is configured to lock or unlock the closure 112 upon confirmation of authorized access.

Authorized access is confirmed by receipt of an authorization input. The authorization input is a unique input, which is changed for each subsequent user and/or each subsequent usage instance of the storage compartment 110. The authorization input is associated with the storage compartment 110, such that subsequent operation (e.g., unsecuring) of the storage compartment 110 requires providing the authorization input. The authorization input may, for example, be a user-entered code (e.g., pin code, password, gesture sequence, etc.), a digital key (e.g., passcode, electronic signal, or token communicated to the storage compartment 110 by the portable electronic input device 116'), or an identity signature of the user (e.g., a biometric, such as a fingerprint, facial recognition, voice recognition, etc.) or a signature associated the user's electronic device 220 (e.g., by the user being logged in to the user-end software program).

Upon subsequently providing the authorization input, the closure 112 is operated (e.g., to lock or unlock). The authorization input may be received directly by the storage compartment 110, or indirectly via the vehicle 100, the user electronic device 220, and/or the central computer system 230 using the various input devices, sensors, and/or transceivers thereof (as described above). It should be noted that a form of the authorization input may change after receipt by the vehicle 100, the user electronic device 220, and/or the central computer system 230, which then provide the authorization input as another authorization signal to the storage compartment 110.

As a result, multiple storage compartments 110 in a single vehicle may be simultaneously used by different users, but are not accessible by each other user. For example, when a first storage compartment is operable (e.g., unsecurable, or unlockable) by a first user electronic device 220 and a second storage compartment is operable by a second user electronic device 220, the first storage compartment 110 is not also operable by the second user electronic device 220 and the second storage compartment 110 is not also operable by the first user electronic device 220. Stated differently, the storage compartment 110 is not operable at a given time by two different user electronic devices 220, which are otherwise unassociated with each other (e.g., not sharing a shared or affiliated accounts or login credentials).

The authorization input may be provided actively or received passively. When provided actively, the user takes action to provide the authorization input, such as by entering the authorization code, triggering sending of the digital key, touching a fingerprint sensor, moving into proximity of a camera, and/or providing a voice input.

When provided passively, the user takes no dedicated action to provide the authorization input, but rather one or more of the various input devices, sensors, and/or transceivers are configured to automatically send, receive, and/or observe the authorization input. For example, the user electronic device 220 may communicate the digital key or its identity when in proximity to the vehicle 100 and/or the storage compartment 110. Alternatively, the vehicle 100 and/or the storage compartment 110 may identify the user electronic device 220 being in proximity to the vehicle 100 and/or the storage compartment 110 (e.g., by receiving an identifier broadcast from the user electronic device 220). Still further, a camera of the vehicle 100 or the storage compartment 110 may passively observe passengers of the vehicle 100 to identify the user with facial recognition. In these examples, the authorization input may be passively provided and/or observed using the vehicle-end and/or user-end ridesharing or delivery software program. This passive providing of the authorization input may also allow the storage compartment 110 to be operated (e.g., by unlocking the closure 112) in advance of the vehicle 100 reaching the user, or otherwise without notice to the user.

While authorized access is granted via the authorized input, authorized access may be expanded or restricted in various additional manners. For example, authorized access may be expanded by creating one or more additional authorization inputs (e.g., subservient authorization inputs) that are also associated with the storage compartment 110 for a given user or usage instance. For example, the subservient authorization input may be provided to other user devices associated with the user (e.g., having a shared account, affiliated accounts, shared login credentials, such as for a family member), when delivering contents of the storage compartment 110 to another user (e.g., a recipient), or to provide inspection access (e.g., for airport security). Furthermore, access may also be provided by an access override via the central computer system 230 (e.g., if the user is unable to provide the authorization input, or the authorization input is not ultimately receivable or transferable to the storage compartment 110).

Authorized access may also be limited in various manners. For example authorized access may be limited by further authorization criteria, such as location (e.g., geofencing), time of day, and/or a usage duration (e.g., corresponding to a delivery time and/or location) of the storage compartment 110. These additional authorization criteria may be determined by the various controllers and/or sensors of the vehicle 100, the storage compartment, or the user electronic device 220 (e.g., a global positioning system).

Further security measures may be utilized to address unauthorized access to the storage compartment or attempts therefor. For example, after unsuccessful attempts to provide the proper authorization input, access may be prevented for a lockout period, until a replacement authorization input is created (e.g., by the central computer system 230) and then provided by the user, or until an access override is provided (e.g., upon confirming the identity of and/or authorization for the person attempting to access the storage compartment 110). Further, the storage compartment 110 may detect forced, unauthorized access to the storage compartment 110. An identifying record may be made of the person attempting to access or having forced open the storage compartment 110, such as by acquiring, storing, and/or sending fingerprint data, a picture, an audio recording of the person, and/or a corresponding alert to the user.

The storage compartment 110 may include various additional functionality and related systems or components. As discussed in further detail below, various storage compartments 110 may be removable from the vehicle 100, move autonomously, provide heating/cooling/insulation, control humidity, assess contents, and/or provide tracking.

The storage compartments 110 may be fixed or removable from the vehicle 100. Storage compartments 110 that are removable and additionally physically securable to the vehicle 100 (e.g., using a selectively operable locking mechanism). Among other advantages, the storage compartments 110 that are removable allow for better time utilization of the vehicle 100 and transfer of the storage compartments 110, including their contents, independent of the vehicle 100. For example, the storage compartment 110 may be left by the vehicle 100 at a user-defined location, so as to securely keep or deliver the contents thereof to the user or other recipient at user specified locations. The vehicle 100 is thereafter usable by other users or for other purposes, and the storage compartment 110 may be later picked up by the same vehicle 100 or another vehicle 100. The storage compartment 110 may be removed by the user, another person, and/or equipment associated with operation of the vehicle 100 (e.g., a driver and/or manually or automatically operated lifting and removal device), another person or equipment associated with a drop off location (e.g., an attendant at a service station and/or manually or automatically operated lifting and removal device), or by the storage compartment 110 itself (e.g., if self-propelled as described below).

In another example, the storage compartment 110 may be left temporarily in a secure holding area of an intermediate user destination, such as at a shopping mall. The storage compartment 110, and its contents, thereby remain in close proximity to the user, while the vehicle 100 is thereafter usable by other users or for other purposes. When requested by the user (e.g., based on a reservation or later request), the storage compartment 110 is then picked up at the holding area and the user is picked up at the user destination by the same vehicle 100 or another vehicle 100.

In a still further example, the vehicle 100 transports and leaves the storage compartment 110, including the user contents, at a remote location, such as a vehicle service station. The vehicle 100 is thereafter usable by other users or for other purposes. When requested by the user (e.g., based on a reservation or later request), the vehicle 100 or another vehicle 100 picks up and transports the storage compartment 110 to the user at a passenger pickup location or a delivery location. The storage compartment 110 may be picked up or loaded by the user, another person, and/or equipment associated with operation of the vehicle 100 (e.g., a driver and/or manually or automatically operated lifting and removal device), another person or equipment associated with a temporary holding (e.g., an attendant at a service station and/or manually or automatically operated lifting and removal device), or by the storage compartment 110 itself (e.g., if self-propelled as described below).

In yet another example, the storage compartments 110, including those with various auxiliary functions, are stored at a secure repository, such as a vehicle service station. When a storage compartment is requested by the user with certain storage requirements (e.g., capacity such as size/weight, environmental controls such as heating/cooling/humidity, etc.), the appropriate storage compartment is loaded and secured into the vehicle 100 and brought to the user.

According to still further embodiments, one or more of the storage compartments 110 are self-propelled and/or move autonomously (e.g., are self-navigating, or are autonomously movable devices). The storage compartments 110 that are self-propelled and/or move autonomously allow the storage compartments 110 to follow the user, move independently of the user to rendezvous with the user at different locations, and/or deliver contents to the user without the user moving to the vehicle 100.

Storage compartments 110''' that are self-propelled may includes a propulsion mechanism. One example of a propulsion mechanism includes, for example, a power supply 115 and a motor 117 for driving wheels 119 of the storage compartments 110''' or for driving other motive components (e.g., legs, tracks, etc.). The storage compartment 110''' receives movement instructions via the input device 214 and/or the transceiver 218, which are executed by the controller 212 according to software programming. The power supply 115 may, for example, be a battery that is charged by the vehicle 100, or at a service station or other charging location. The sensors 216 of the storage compartment are additionally configured for directional navigation (e.g., via a global positioning system thereof, and related geographic or building mapping) and for environmental navigation (e.g., cameras, sonar, and other sensors for evaluating the changing conditions, such as moving people or vehicles). Storage compartments 110''' that follow the user may, for example, additionally include sensors 216 for identifying and following a relative location of a beacon (e.g., provided by the user electronic device 220 or dedicated transmitter) of the user. The storage compartment 110'''' may move itself to/from the vehicle 100, for example, to automatically load/unload contents thereof into/out of the vehicle 100, thereby improving accessibility for those unable (e.g., those physically unable or otherwise occupied) to move objects into/out of the vehicle 100, or functioning as an automated delivery device.

Storage compartments 110 may additionally be configured to provide a conditioned storage environment, for example, by heating, cooling, controlling humidity, and/or thermally insulating contents thereof. The storage compartment 110'' may include a Peltier or other thermoelectric device 150, or may receive conditioned air from the vehicle 100, along with appropriate sensors and controls (e.g., a thermostat and/or humidistat) for controlling an internal temperature and/or humidity of the storage compartment 110. Such storage compartments 110 may additionally include insulation to prevent heat loss or heat gain and/or be sealed to prevent moisture loss or intrusion. Storage compartments 110 having heating, cooling, and/or thermal insulating capabilities may, for example, be used for storing and/or delivering groceries or other thermally sensitive goods. Storage compartments 110 having such environmental condition equipment may be identified to the user via the user-end software program and be specifically requestable by the user.

Storage compartments 110 may also be configured to assess contents in various manners for preventing closure of the storage compartment 110, preventing movement of the vehicle 100, and/or record keeping (e.g., chain of custody). As noted above, the sensors 216 of the storage compartment 110 may include sensors for detection and/or assessing weight, movement, temperature, chemical composition, and/or appearance of the contents. Weight may be assessed using a load cell or other weight sensor, and the determined weight may be used to determine whether the contents are still present in the cavity 111, have changed, and/or exceed a weight capability of the storage compartment 110 (e.g., if self-propelled). Movement may be assessed using an accelerometer, camera, or other motion detection device, and detected movement be used to prevent closure of the storage compartment 110 and/or movement of the vehicle 100 if the contents are determined to be a living organism. Temperature may be assessed, for example, using a temperature sensor, and detected temperature may be used to ensure contents (e.g., food) are maintained at an appropriate temperature. Chemical composition may be assessed using various types of chemical sensors, and detected chemistry may be used to prevent closure of the storage compartment 110 and/or movement of the vehicle 100 if the contents are determined to be dangerous (e.g., explosive) and/or nefarious (e.g., illegal drugs). The visual appearance of the contents may be assessed using one or more visual cameras, infrared cameras, and/or X-ray scanners, and the determined appearance may be used to identify the contents or provide an alert as to possible types of contents (e.g., if used for airport security).

Records of the contents and/or access to the contents (e.g., opening/closing) may be kept, so as to ensure the contents are maintained without change (e.g., if provided to airport or other security checkpoint), to identify and/or alert the owner of contents inadvertently left in the storage compartment, inventory tracking, etc.

The storage compartment 110 may instead or additionally be configured to provide location tracking. In one example, the sensors 216 of the storage compartment 110 include a global or other positioning system to identify its location, while the transceiver 218 sends location information to the user (e.g., via a cellular network) or other recipient. In another example, the storage compartment 110 instead relies on the sensors 206 of the vehicle 100 or the sensors 226 of the user electronic device 220 to determine the current location of the storage compartment 110 to identify the storage compartment 110, such identity and location being sent to the user electronic device 220 or other recipient and/or tracked by the central computer system 230. In yet another example, the storage compartment 110 may be identified by another device (e.g., optical scanner, or receiver) at a known location (e.g., a service station), which then sends the identity of the storage compartment 110 and the known location information to the user, other recipient, and/or the central computer system 230.

Instead of or in addition to the storage compartments 110, the vehicle 100 may instead include one or more accessibility devices 140, such as a wheelchair, motorized scooter, etc. The user may request the vehicle 100 and/or the accessibility device via the user electronic device 220 operating the user-end software program. The accessibility device may, for example, be a passive device, which is not itself able to communicate with the vehicle 100, the user electronic device 220, or the central computer system 230. Alternatively, the accessibility device may include appropriate electronics (e.g., controllers, input devices, sensors, and/or transceivers) to be reserved and subsequently operated in the manner described above for the storage compartment 110 (e.g., requiring an authorization input to be operated). The accessibility device may also be self-propelled and self-navigating (e.g., autonomous), so as to be deliverable to the user in closer proximity to the user than the vehicle 100 (e.g., along sidewalks and/or inside buildings).

Alternative to storage compartments 110 being requestable by the user, the storage compartments 110 may be utilized in other usage or ownership models. For example, the storage compartments 110 and/or the vehicle 100 may be owned by a user, in which case the storage compartment 110 may incorporate one or more of the various features discussed above (e.g., self-moving, heating/cooling, securable, location tracking, etc.). The storage compartments 110 may also be rented by the user for an extended period of time (e.g., as luggage for a trip) in which case the storage compartments 110 may also incorporate various features discussed above (e.g., self-moving, securable, location tracking, etc.). The storage compartments 110 and/or the vehicle 100 may be used as a delivery service for a vendor, such as a restaurant delivering food to various different customers with separately secured storage compartments 110 in one or more vehicles.

The vehicles 100, the storage compartments 110, and/or the user electronic devices 220 are used according to various methods for storing and/or transporting users' contents, as well as for transporting passengers, which are implemented using software programs (e.g., the user-end, vehicle-end, and back-end software programs referenced above). As discussed in further detail below, the software programs allow users to request (e.g., reserve, summons, hail, etc.) the vehicle 100 and/or the storage compartment 110 to locations based on passenger requirements (e.g., number of available seats in the vehicle 100), and/or storage requirements (e.g., size and/or other auxiliary features of available storage compartments 110).

According to the method shown in the flowchart of FIG. 3, in a first step S402, first instructions are received from a first user for a vehicle and/or storage compartment to be in a first location. The instructions may originate or be sent by the first user (User$_1$) as a request (e.g., reservation, summoning, hailing, etc.) using the user electronic device 220, and received by the first vehicle 100$_1$ (e.g., an electronic device of the driver). The instructions may additionally identify a second location and/or routing information to or along which the vehicle 100$_1$ and/or the first storage compartment 110$_1$ are to be moved. The second location or routing information may instead be received in subsequent instructions. The instructions may additionally include passenger and/or storage requirements, for example, specifying the number of passengers (if any, or if solely for contents delivery) and specifying the quantity, size, auxiliary requirements, etc. of the requested storage compartments 110).

For example, the user may submit a request via the user electronic device 220, the request is broadcast to a plurality of the vehicles 100 via the central computer system 230, and a first of the vehicles 100$_1$ accepts the request and, thereby, receives the instructions. Alternatively, the request may be assigned by the central computer system 230 to the first of the vehicles 100$_1$. In a still further alternative, the user may view available vehicles 100$_{1-m}$ with their passenger and storage capacities, which may be filtered by the user according to location/route, passenger, and storage requirements, and select an available vehicle 100 meeting or nearly meeting such requirements.

In a second step S404, the first vehicle 100$_1$ and/or the first storage compartment 110$_1$ are moved to the first location according to the first instructions. It should be noted that when the user requests only the storage compartment 110 (e.g., requests a delivery), the vehicle 100 by which the storage compartment 110 is moved may be irrelevant to the user.

In a third step S406, the first storage compartment 110$_1$ receives first contents of the first user therein, and the storage compartment 110 is secured. For example, the closure 112 is locked. The third step S406 may occur after the first step S402 and the second step S404. However, the first step S402 and the second step S404 may be omitted. For example, the user may already be a passenger of the first vehicle 100$_1$ containing the storage compartment 110$_1$, and then become a user of the first storage compartment 110$_1$ (e.g., by placing contents therein, and securing the storage compartment 110$_1$).

In a fourth step S408, a first unique authorization input is associated with the first storage compartment 110$_1$. The unique authorization input may, as described, be a user-defined code, an automatically generated token, or an identity (e.g., a biometric of the user, or a signature of the user electronic device 220). The authorization input may be created prior to or substantially coincident with the use of the storage compartment 110 (e.g., between submitting the request for and subsequently securing the storage compartment 110), but is associated with the storage compartment 110 substantially coincident with the use thereof. By associating the authorization input with the first storage compartment 110$_1$ coincident with its use, the storage compartment 110$_1$ may be subsequently unsecured (e.g., opened) providing the authorization input associated therewith, or with a subservient authorization input or an override, as discussed above.

In a fifth step S410, the first vehicle 100$_1$ and/or the storage compartment 110$_1$ are moved to a second location. The first storage compartment 110$_1$ may be moved by the first vehicle 100$_1$.

Figure 4A:
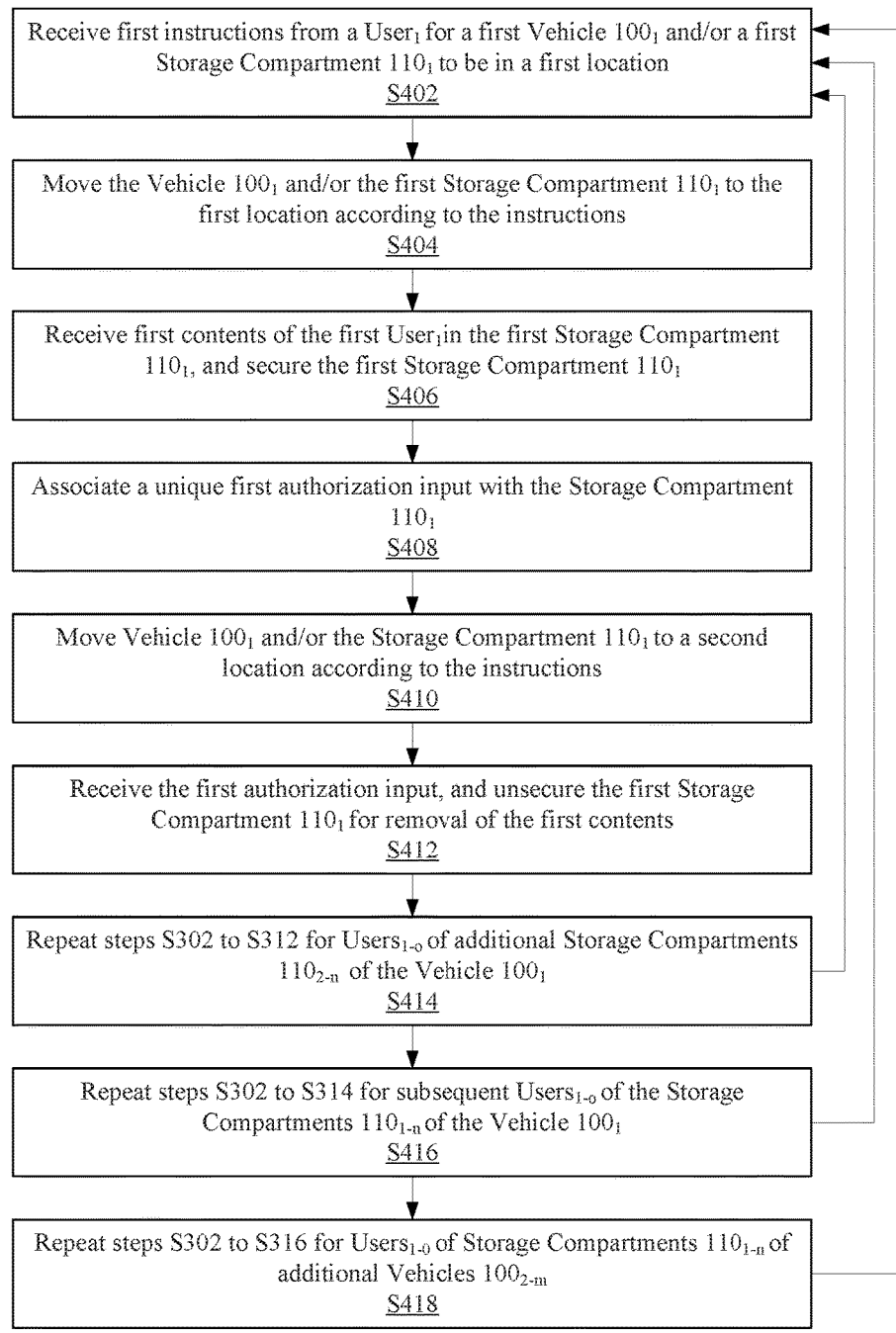
FIG. 4A is a flowchart of an exemplary method.
Figure 4B:
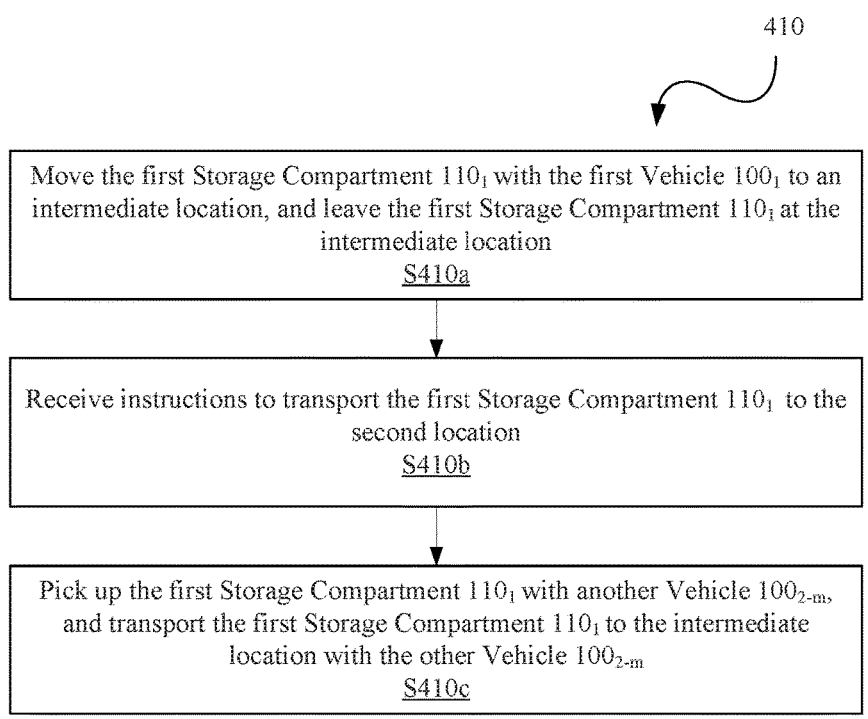
FIG. 4B is a flowchart of an alternative method of a substep of the method shown in FIG. 4A.

Alternatively, as shown in FIG. 4B, the fifth step S410 includes moving the storage compartment 110 with another of the vehicles 100$_{2-m}$. In a first substep S410$a$ of step S410, the first vehicle 100$_1$ transports the first storage compartment 110$_1$, which remains secure, to a temporary storage or holding area, which may be of a user destination or a vehicle service station, as described above. In a second substep S410$b$, instructions are received to transport the storage compartment to the second location (e.g., according to a previously-scheduled reservation or in response to a current request of the user). In a third substep S410c, another of the vehicles $100_{2-m}$ picks up the first storage compartment $110_1$, and transports the storage compartment $110_1$ to the second location.

Referring back to FIG. 4A, in a sixth step S412, the authorization input associated with the first storage compartment $110_1$ is received, and the storage compartment $110_1$ is unsecured in response to receipt of the authorization input. As noted above, the authorization input may be provided by the user to and received by one or more of the various input devices, sensors, and/or transceivers of the vehicle 100, the storage compartment 110, and/or the user electronic device 220.

In a seventh step S414, steps S402 to S412 are repeated for users (Users$_{2-o}$), which may include the first user, of additional storage compartments $110_{2-n}$ of the first vehicle $100_1$. The seventh step S414 is performed for the additional storage compartments 110 in a manner that does not conflict with steps S402 to S412 for the first storage compartment $110_1$. For example, the seventh step S414 may be performed, while the first storage compartment $110_1$ remains secure with contents of the first user therein, but while the first vehicle $100_1$ is not actively transporting the first user (User$_1$) as a passenger and/or not missing a timed delivery of the contents of the first storage compartment $110_1$. That is, contents of one user (User$_1$) secured in the first storage compartment $110_1$ may remain in the first vehicle $100_1$, while the first vehicle $100_1$ is being used by another user (User$_{2-o}$).

In an eighth step S416, steps S402 to S414 are repeated for subsequent users (Users$_{1-o}$), which may include any previous users, of the first storage compartment $110_1$ and the additional storage compartments $110_{2-n}$ of the first vehicle $100_1$. Thus, the storage compartments $110_{1-n}$ are reused sequentially by different users (Users$_{1-o}$) having different authorization inputs associated with each storage compartment $110_{1-n}$ for such subsequent uses. The eighth step S416 is performed in a manner that does not conflict with steps S402 to S414 (e.g., by not using storage compartments $110_{1-n}$ that are already secure, not causing conflicting delivery/dropoff/pickup times, etc.).

In a ninth step S418, steps S402 to S416 are repeated for users (Users$_{1-o}$), which may include any previous user, of storage compartments of additional vehicles $100_{2-m}$. Thus, the vehicles $100_{1-m}$, along with their storage compartments $110_{1-n}$, may be reused by subsequent users (Users$_{1-o}$). The ninth step S418 is performed in a manner that does not conflict with steps S402 to S416 (e.g., by not sending vehicles 100 that are already transporting other passengers, not causing conflicting delivery/dropoff/pickup times, etc.).

What is claimed is:

1. A vehicle, comprising:
   a vehicle body; and
   storage compartments that are located in the vehicle body, each of the storage compartments having a cavity and a closure that selectively secures the cavity,
   wherein a respective authorization input is associated with each of the storage compartments,
   wherein the closure of each of the storage compartments is operable to secure the cavity by a respective user and subsequently unsecure the cavity upon receipt of the respective authorization input from the respective user, and
   wherein the vehicle is a passenger vehicle.

2. The vehicle of claim 1, wherein the respective authorization input is a code.

3. The vehicle of claim 1, wherein the respective authorization input is a digital key.

4. The vehicle of claim 1, wherein the respective authorization input is received passively.

5. The vehicle of claim 1, wherein the respective authorization input is received from a user electronic device.

6. The vehicle of claim 1, wherein the respective authorization input for each of the storage compartments is changed for a subsequent user.

7. The vehicle of claim 1, wherein the storage compartments are removable from and securable to the vehicle body.

8. The vehicle of claim 1, wherein the storage compartments are fixed to the vehicle body.

9. The vehicle of claim 1, wherein the vehicle is operable to navigate autonomously to a user location in response to a user request for access to the storage compartments.

10. The vehicle according to claim 1, wherein the vehicle body defines a primary compartment that is a passenger compartment for transporting users of the storage compartments.

11. The vehicle of claim 10, wherein the storage compartments are located in the primary compartment.

12. The vehicle according to claim 1, further comprising a controller, wherein the controller is configured to receive one or more first requests from a first user for transport of the first user with the vehicle and use of a first storage compartment of the storage compartments, the first user being able to unsecure the cavity of the first storage compartment with the respective authorization input associated therewith.

13. The vehicle according to claim 12, wherein the controller is configured to receive one or more second requests from a second user for transport of the second user with the vehicle and use of a second storage compartment of the storage compartments, the second user being able to unsecure the cavity of the second storage compartment with the respective authorization input associated therewith; and
   wherein the first user is unable to unsecure the cavity of the second storage compartment, and the second user is unable to unsecure the cavity of the first storage compartment.

14. The vehicle according to claim 12, wherein the controller is one of physically coupled to the vehicle or another electronic device associated with the vehicle.

15. A storage compartment, comprising:
   a cavity;
   a closure that is operable to secure the cavity and unsecure the cavity in response to an authorization input; and
   a propulsion mechanism that is connected to the cavity to autonomously move the cavity;
   wherein the storage compartment is configured to communicate with passenger vehicles to which the storage compartment is physically securable.

16. The storage compartment of claim 15, wherein the propulsion mechanism causes movement of the cavity from a first location to a second location in response to a user request.

17. The storage compartment of claim 16, wherein the first location is in a first vehicle of the passenger vehicles, and the cavity is connectable to the first vehicle.

18. The storage compartment of claim 17, wherein the second location is in a second vehicle of the passenger vehicles.

19. The storage compartment of claim 15, wherein the propulsion mechanism causes movement of the cavity based on movement of a user to follow the user.

20. The storage compartment according to claim 15, wherein the storage compartment is configured to communicate with the passenger vehicles to receive the authorization input.

21. A method comprising:
receiving a first user request from a first user for access to a first storage compartment that is located in a vehicle, wherein the vehicle is at a first location;
receiving first contents in the storage compartment from the first user;
causing the vehicle to move autonomously from the first location to a second location after receiving the contents, wherein the second location is away from the first user;
receiving a second user request for access to the first storage compartment, wherein the first user is located at a third location;
causing the vehicle to move autonomously from the second location to the third location after receiving the second user request for access to the storage compartment;
receiving a fourth user request from a second user for access to a second storage compartment that is located in the vehicle;
receiving second contents in the second storage compartment from the second user; and
receiving a fifth user request from the second user for access to the second storage compartment;
wherein the first storage compartment is not accessible by the second user, the second compartment is not accessible by the first user, and the vehicle is a passenger vehicle for transporting the first user and the second user.

22. The method of claim 21, further comprising:
associating a first authorization input with the first storage compartment, and associating a second authorization input with the second storage compartment.

23. The method of claim 22, further comprising:
securing the first storage compartment subsequent to receiving the first contents, and securing the second storage compartment subsequent to receiving the second contents; and
unsecuring the first storage compartment upon receipt of the first authorization input, and unsecuring the second storage compartment upon receipt of the second authorization input.

24. The method according to claim 21, further comprising transporting the first user with the vehicle at a first time, and transporting the second user with the vehicle at a second time.

* * * * *